United States Patent [19]
Aehnelt et al.

[11] Patent Number: 5,111,592
[45] Date of Patent: May 12, 1992

[54] PROBE HEAD OF THE SWITCHING TYPE

[75] Inventors: Peter Aehnelt, Oberkochen; Eckhard Enderle, Aalen-Dewangen, both of Fed. Rep. of Germany

[73] Assignee: Carl-Zeiss-Stiftung, Heidenheim/Brenz, d/b/a Carl Zeiss, Oberkochen, Oberkochen, Fed. Rep. of Germany

[21] Appl. No.: 779,362

[22] Filed: Oct. 17, 1991

[30] Foreign Application Priority Data

Jul. 12, 1991 [DE] Fed. Rep. of Germany ....... 4123081

[51] Int. Cl.$^5$ ................................................ G01B 5/03
[52] U.S. Cl. ........................................ 33/561; 33/559; 33/558; 33/504
[58] Field of Search ................. 33/561, 559, 560, 556, 33/558, 557, 503, 504

[56] References Cited

U.S. PATENT DOCUMENTS

| | | | |
|---|---|---|---|
| 3,566,479 | 3/1971 | Pascoe et al. | 33/503 |
| 4,177,568 | 12/1979 | Werner et al. | 33/561 |
| 4,473,955 | 10/1984 | McMurney | 33/561 |
| 4,513,507 | 4/1985 | Laskowski | 33/558 |
| 4,523,382 | 6/1985 | Werner et al. | 33/561 |
| 4,535,543 | 8/1985 | Linder | 33/559 |
| 4,562,646 | 1/1986 | Dall'Aglio | 33/559 |
| 4,603,482 | 8/1986 | Cusack | 33/559 |
| 4,734,994 | 4/1988 | Cusack | 33/832 |
| 4,964,223 | 10/1990 | Linder et al. | 33/559 |
| 4,972,597 | 11/1990 | Kadosaki et al. | 33/556 |

FOREIGN PATENT DOCUMENTS

| | | | |
|---|---|---|---|
| 3321454 | 10/1983 | Fed. Rep. of Germany | 33/559 |
| 3625636 | 2/1988 | Fed. Rep. of Germany | 33/503 |
| 0151502 | 9/1983 | Japan | 33/559 |
| 1260659 | 9/1986 | U.S.S.R. | 33/503 |
| 1359637 | 12/1987 | U.S.S.R. | 33/556 |
| 9000716 | 1/1990 | World Int. Prop. O. | 33/559 |

Primary Examiner—Thomas B. Will
Attorney, Agent, or Firm—Hopgood, Calimafde, Kalil, Blaustein & Judlowe

[57] ABSTRACT

A probe head for a multiple-coordinate measuring machine defines the at-rest or zero position of a movable probe-pin holder part with respect to a relatively fixed housing part of the head, by employing a flexible coupling between a circular base of the probe-pin holder and a circular reference surface of the housing. The flexible coupling comprises a stacked plurality of interconnected flat disks or rings of spring material, one ring on top of the next, and their interconnections are at sector regions which are at progressively staggered, angularly offset locations, from one to the next pair of sector-connected adjacent surfaces in the stack. In the at rest condition, all rings of the coupling are axially compressed, with their flat surfaces in direct axial abutment with each other, as well as with the fixed part and the movable part of the probe head. Provision is made for switched entry of measuring-machine coordinates as of the instant of probe-pin contact with a workpiece, and for automatically avoiding entry of measuring-machine coordinates that are not based on such probe-pin contact.

18 Claims, 5 Drawing Sheets

PROBE HEAD OF THE SWITCHING TYPE

BACKGROUND OF THE INVENTION

The present invention relates to a probe head of the switching type, such as used, for example, in coordinate-measuring machines (CMM) or for the measuring of workpieces on machine tools. Much a probe head is described in U.S. Pat. No. 4,177,568.

Probe heads of the switching type have a positioning support which establishes with high precision, the zero position of the probe-pin carrier. The probe-pin carrier is the movable part of the probe head and is located in the zero position prior to a work-contacting procedure; and the probe-pin carrier returns to the zero position after each contacting procedure. This positioning support is, as a rule, developed as a statically determined threepoint support and illustratively consists of three pairs of balls lying in a plane, for unambiguous seating engagement with radially protruding cylinders; alternatively, the positioning support may consist of three V-shaped notches into which three balls engage, and there are other technically equivalent embodiments. All of these supports, however, have the disadvantage that, due to customary spring-loading of the movable part in the direction of zero-position seating, the course of probe deflection is very asymmetrical for lateral work-contacting displacements; the asymmetry is various depending on the direction of work-contacting displacement, since the probe-pin carrier can tilt one time over one support point and the next time over the line connecting two support points, in which case the tilt axis is closer to the axis of the probe pin. As a consequence, work-contacting forces are unequal, and measurement uncertainties result, since different workcontacting forces can also give rise to different bends of the probe pin, before developing the electrical workpiece "contact pulse" which is relied upon to characterize the point of probe-pin contact with the surface of the workpiece.

This problem is already known and there has been no lack of attempts to solve the problem by providing statically overdetermined supports for the movable part of the probe head, such that in its zero position the probe-pin carrier lies either on a very large number of points or on an annular support part.

For example, Federal Republic of Germany OS 1,937,154 describes a stylus-operated copying device having a movable part which is dish-shaped in the region of its support and having an outer periphery which, in its position of rest, engages the plane of an annular resting surface on a fixed part of the copying device. A two-layer membrane centers the movable part in the annular plane and urges the same axially against the annular supporting surface. For this purpose, the two individual membranes are spread somewhat with respect to each other in the position of rest. This arrangement is not satisfactory for measurement purposes, since centering stability is relatively poor. Furthermore, the two individual membranes are edge-connected, so that only relatively slight deflection movements can be tolerated if the membrane is not to be overstressed.

U.S. Pat. No. 3,566,479 describes a probe head of the measuring type, wherein the movable part is centered by a single-layer membrane (FIG. 14). This single-layer membrane is fastened to the movable part and in its position of rest either lies against an annular collar on the stationary part, or is urged against it. But this type of support also permits only slight deflection. Furthermore, with this construction, the angular position of the movable part in its position of rest is determined with only very slight precision, due to the small diameter of the annular collar and the radial distance between the movable part and the annular collar.

European Patent No. A2 0,303,831 describes a probe head of the switching type having a probe-pin carrier that is centered by five disks lying one above the other, the disks being in each case connected in pairs to each other at their ends and permitting probe-pin carrier displacement on defined axes which are parallel to the coordinate directions. However, the probe-pin carrier lies on three or four support points in the direction of the axis of the probe pin. This known probe head, however, is also unsatisfactory, for its lack of precision in restoring the probe-pin carrier to its at-rest position, i.e., centering precision and uniformity of work-contacting force are both unsatisfactory. Furthermore, the involved probe head requires relatively large space due to the rectangular arrangement of the tilting axes.

BRIEF STATEMENT OF THE INVENTION

The object of the present invention is to provide a probe head of the switching type which is of the simplest possible construction, wherein workpiece-contacting forces are independent of the direction of workpiece contacting, and wherein the zero position of the probe-pin carrier is reproduced as accurately and in as stable a manner as possible.

The invention achieves this object in a probe head of the switching type wherein the deflectable part which mounts the probe pin is centered in its position of rest by a flexible coupling stack ("Membran") of flat leaf-spring rings and is urged axially against a fixed part of the probe head. The flexible coupling consists of a stacked plurality of interconnected flat disks or rings of spring material, one ring on top of the next, and their interconnections are at sector regions which are at progressively staggered, angularly offset locations, from one to the next pair of sector-connected adjacent surfaces in the stack. In the at-rest condition, all rings of the coupling are axially compressed, with their flat surfaces in direct axial abutment with each other, as well as with the fixed part and the movable part of the probe head. Provision is made for switched entry of measuring-machine coordinates as of the instant of probe-pin contact with a workpiece, and for automatically avoiding entry of measuring-machine coordinates that are not based on such probe-pin contact.

Probe-pin carrier support in accordance with the invention belongs to the group which is classed as statically overdetermined supports, being based on the concept of taking up all degrees of freedom with only one structural part. This structural part is a coupling, formed of a stacked plurality of eccentrically interconnected individual flat spring rings which lie on top of each other. Since the spring rings lie flat on each other in the zero position of the probe-pin carrier, the structural coupling is very stiff in its determination of a reference or zero-position plane, and therefore a high precision of restoration is obtained for the probe-pin carrier. Accordingly, large deflection paths of the probe pin can be tolerated without the danger of an irreversible deformation of any of the flat spring rings.

In customary manner, the movable part of the probe head, i.e., the probe-pin carrier, can be urged against the fixed part of the probe head by means of a spring or by magnetic forces.

The spring forces for zero-position restoration can also be provided by the inherent elasticity of the coupling, i.e., by the spring properties of the material of the spring rings alone, thus offering the advantage that an additional spring can be dispensed with and the probe head can be made shorter. In other words, by having eliminated the need for a separate compression spring, provision for its compressed length, as well as for the structural length of associated compression-spring retaining parts, becomes unnecessary.

It is particularly advantageous for the moving part (i.e., the probe-pin carrier) to be urged against the fixed housing part not only by axial spring force that is inherent in elasticity of the spring rings of the coupling, but also by use of magnetic forces. By superposing the spring force and the magnetic force, a practically constant or even decreasing force characteristic can be obtained, i.e., the contacting force can be designed to remain constant or to decrease as a function of increasing deflection. In this way, problems which might otherwise arise from reliance upon a single compression spring, such as probe damage to a sensitive surface, or breakage of a thin probe pin, can be avoided.

No additional elements are necessary for the application of the magnetic force since it is sufficient to magnetize the movable probe-pin carrier or the spring rings themselves. The two-dimensional shape of the spring rings affords this possibility in simple manner. However, it is also possible to use axially displaceable permanent magnets since in such case the magnetic force can be adjusted and adapted to the spring force.

With regard to the number of interconnected individual leaf-spring rings, lying one on top of the other, there should be at least two such rings and, to assure sufficient deflection and simultaneous stiffness of centering, three spring rings have proven particularly suitable. These spring rings are advisedly so connected to each other that the points of connection of the individual rings are shifted in each case by 120° about the longitudinal axis of the probe pin. With this development, a very uniform distribution of the contacting forces is obtained, regardless of the direction of probe-deflection from the at-rest orientation of the probe axis.

DETAILED DESCRIPTION

Further advantages of the invention will be explained in the following detailed description, in connection with the accompanying drawings, in which.

Figure 1:
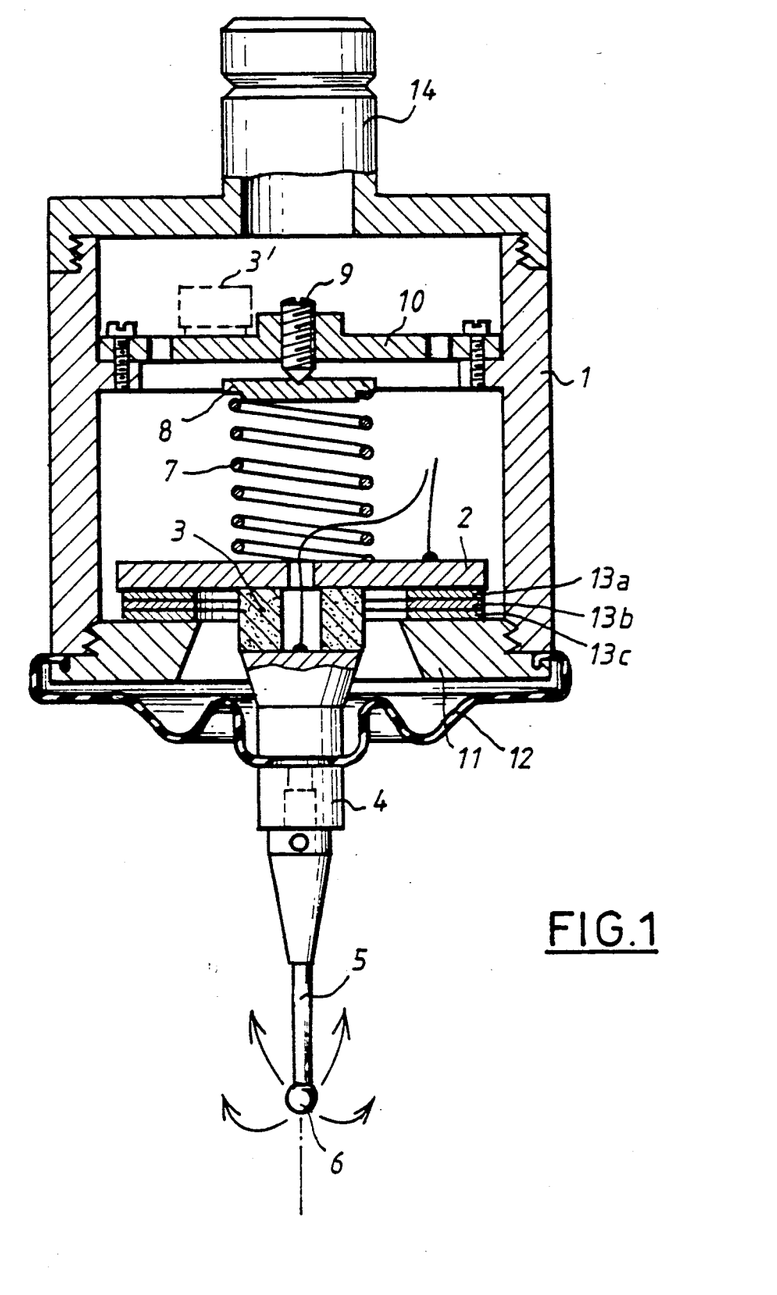
FIG. 1 is a view in cross section, taken in a plane containing the longitudinal axis of a first probe-head embodiment of the invention.

The probe head of FIG. 1 has a cylindrical fixed housing part 1 which is closed at its upper end by a removable cover which carries the stud pin 14 via which the probe head can be mounted, illustratively to a coordinate-measuring machine.

An annular collar 11 is secured to the lower end of housing part 1 to establish a flat annular surface for support of a movable probe-pin carrier, which is shown to comprise a base plate 2 and a cylindrical element 4 which extends through the central opening of collar 11; a probe pin 5 having a probe ball 6 at its lower end is threadedly engaged to and suspended from the cylindrical element 4. An annular piezoelectric element 3, which serves as the signal transmitter for production of the workpiece-contacting pulse, is fixed as by suitable adhesive to parts 2 and 4. The piezoelectric element 3 will be understood to have electrical-lead connections to an electronic amplifier, schematically shown only by phantom outline 3' and carried by an intermediate plate 10 that is fixed within the housing.

A compression spring 7 axially loads plate 2 of the probe-pin carrier in the direction toward collar 11 of the probe-head housing. An adjustment screw 9 in the intermediate plate 10 serves for adjusting spring force, and the pointed lower end of screw 9 locates in a conical depression of a pressure plate 8 which is either fixed to or otherwise centrally located on the upper end of spring 7.

Base plate 2 of the probe-pin carrier is coupled to and bears on the housing collar 11 via three spring rings 13a–c which are stacked directly, one on top of the other. These spring rings center the probe-pin carrier in a plane perpendicular to the longitudinal axis Z of the probe pin and at the same time also form the abutment in the direction of the longitudinal axis Z.

Figure 2:
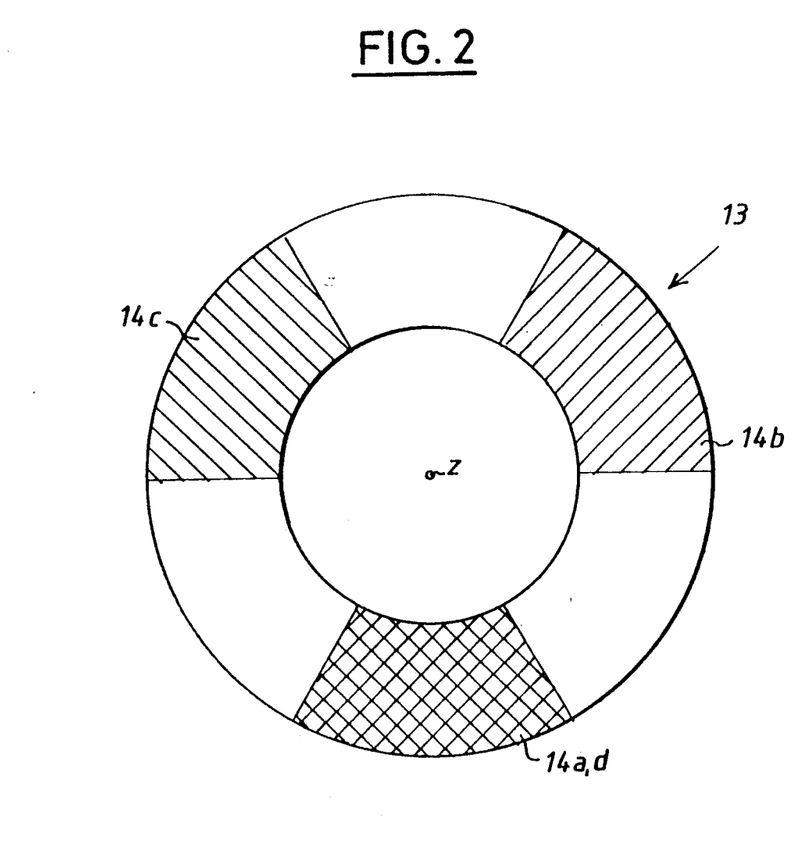
FIG. 2 is a top view of a coupling component of the probe head of FIG. 1.
Figure 3:
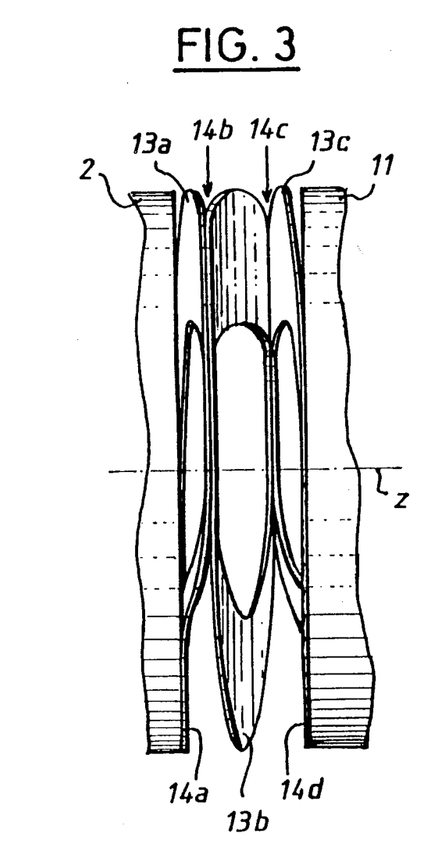
FIG. 3 is a side view of the coupling component of FIGS. 1 and 2, to show membrane separation for a deflected probe condition.

As can be noted from the plan view of FIG. 2 and the side view of FIG. 3, the three spring rings 13a–c are in each case securely connected to each other at one location. Thus, collar 11 is connected in the hatched sector region 14d with spring ring 13c; spring ring 13c is securely connected in the hatched region 14c with the next spring ring 13b, and the latter in turn is securely connected in the hatched region designated 14b with the third spring ring 13a. Spring ring 13a, in turn, is securely connected with the base plate 2 of the movable probe-pin carrier at an angular location 14a which registers above the region 14d. The connection at each of the locations 14a, 14b, 14c, 14d is planar and is illustratively effected by suitable adhesive glue or by welding.

The connecting locations (14a–d) are in each case arranged at progressive angular spacings of 120° about the probe-pin longitudinal axis Z.

In the at-rest position, the three thin spring rings 13a–c lie directly (i.e., flat-to-flat) against each other and thus center the probe-pin carrier with high precision relative to the housing 1. Since the collar 11, the plate 2 and the three spring rings 13a–c can be produced flat with high precision, they at the same time directly and collectively form the abutment which determines the at-rest position of the probe ball 6 in the direction of the axis Z.

For any probe-deflection movement perpendicular to the axis Z, the plate 2 always tilts about a point in the vicinity of the outer circumference of the coupling so that absolutely uniform contacting forces result, regardless of the direction of contacting displacement. In this connection, the coupling part 13 consisting of three spring rings can then perform as is desired, as shown with some exaggeration in FIG. 3, and yield in all directions. An elastomeric boot seal or bellows 12 flexibly completes the closure of the probe-head housing to the movable-cylindrical element 4 of the probe-pin support, thus assuring precise and trouble-free action of the coupling part 13, unimpeded by dust particles.

Figure 4:
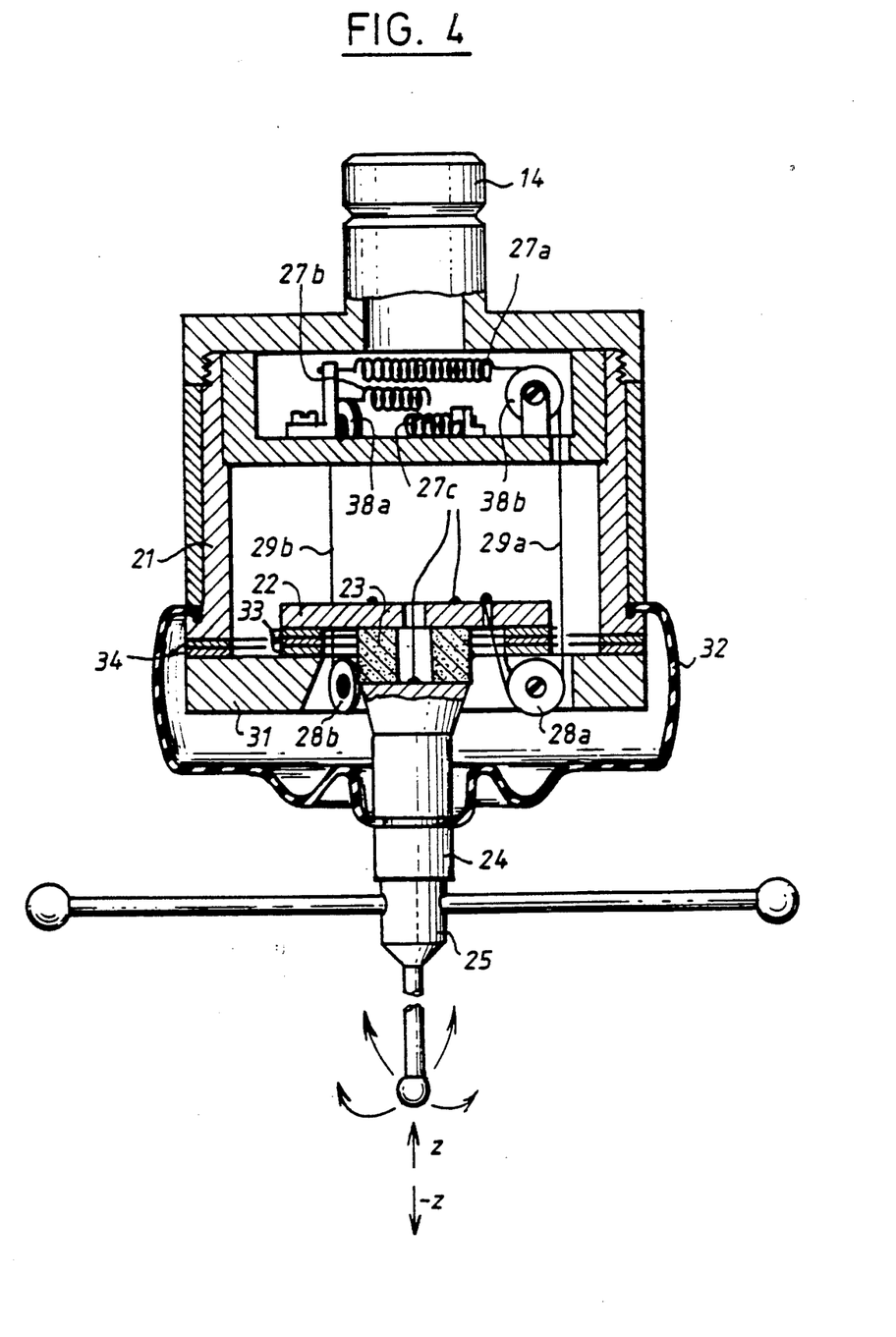
FIG. 4 is a view similar to FIG. 1, for a second embodiment of the probe head of the invention.

As compared with the probe head of FIGS. 1 to 3, the probe head of FIG. 4 additionally permits probe-deflection movement in the Z direction, i.e., the probe pin 25 can also be pulled out downward from the stationary housing part 21 if such movement should be necessary, as for example when contacting horizontally located bore holes. For this purpose, an intermediate ring 31 is supported by an annular coupling part 34 below the open bottom of the fixed cylindrical housing part 21. The coupling part 34 consists of two spring rings, located one above the other, of the type already shown and described in connection with FIGS. 2 and 3. The two spring rings of the coupling part 34 center the intermediate ring 31 and furthermore form the abutment which determines the position of the intermediate ring 31 in the Z direction.

The probe-pin carrier is supported on the intermediate ring 31 via a second coupling part 33 consisting of three individual spring rings 33a–c in the same manner as described with reference to FIG. 1. The probe-pin carrier again consists of a plate 22 and a cylindrical part 24, and an annular disk 23 of piezoelectric material is secured between the two parts 22, 24. The coupling part 34 consists of only two spring rings since it has a larger diameter than the coupling part 33 and therefore two spring rings are sufficient to obtain, without irreversible deformation, the same stroke as permitted by the part 33.

The movable parts of the probe head 21 are loaded by three tension springs 27a–c in the upper part of the probe head. These springs pull the base 22 of the probe-pin carrier in the direction of axial compression against the intermediate ring 31, the spring forces being transmitted by three cable lines 29a–c over guide pulleys 28a–c on the intermediate ring 31; at the same time, and in the manner of a block and tackle, these same springs pull the intermediate ring 31 (over further guide pulleys 38a–c on the housing 21) in the direction of axial compression of the coupling part 34 against the lower annular rim of housing 21.

As in the case of FIG. 1, the entire probe head of FIG. 4 is protected or closed off by a flexible bellows 32, against penetration of dirt, dust and the like.

Figure 5:
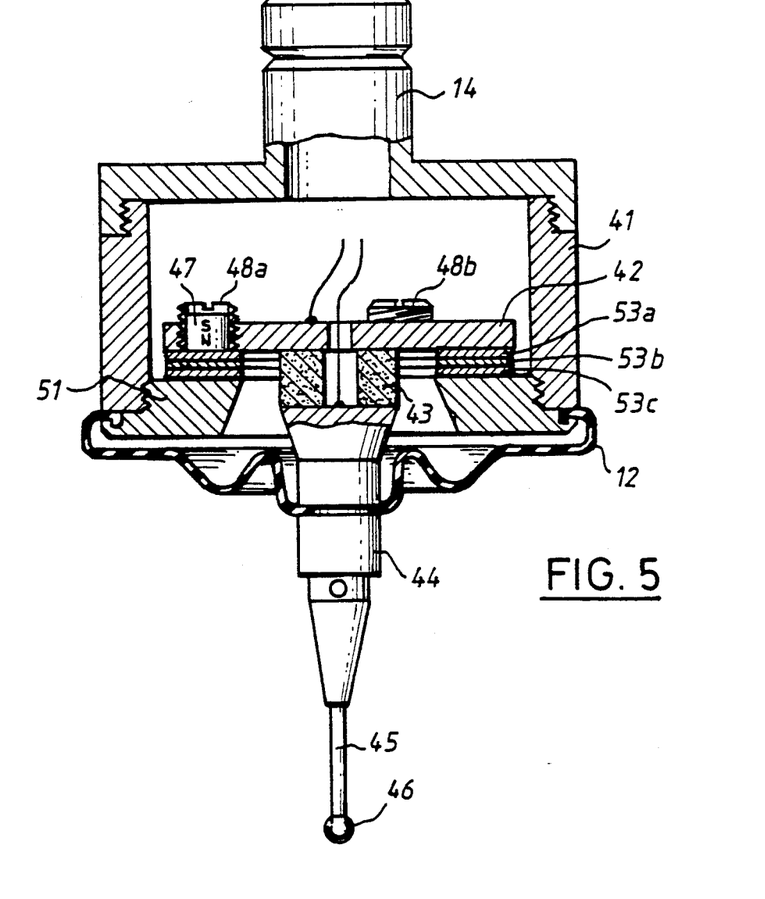
FIG. 5 is a view similar to FIG. 1, for a third embodiment of the probe head of the invention.
Figure 6:
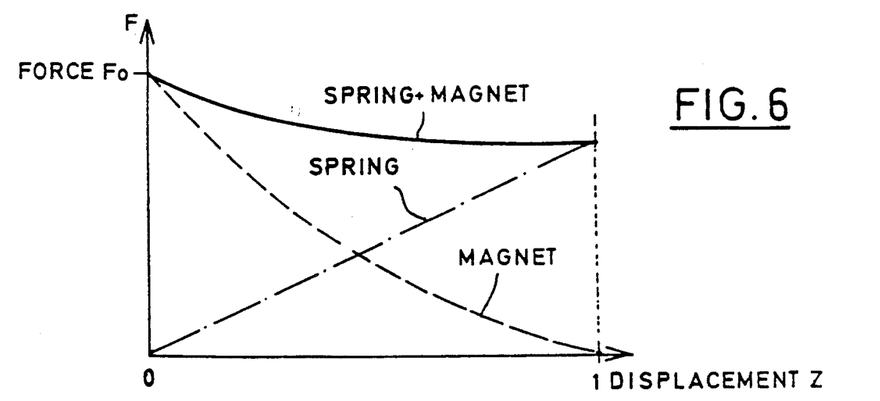
FIG. 6 is a diagram showing the contacting force of the probe head of FIG. 5 as a function of displacement on the path of deflection of a mounted probe pin.

The probe head in the embodiment of FIG. 5 has a development similar to that of FIG. 1. Corresponding parts have therefore been assigned reference numbers that are greater by forty than in FIG. 1; these parts are therefore not redescribed. However, as a point of difference from the probe head of FIG. 1, the compression spring for loading the base plate 42 of the movable probe-pin carrier has been dispensed with. Instead, the three spring rings 53a–c of the coupling part 53 are so designed with respect to their elasticity or stiffness that the spring force still remains below the specified contacting force ($F_o$), even with the maximum permissible movement of deflection. At the same time, the collar 51 on the fixed housing part 41 consists of soft-magnetic material and three permanent magnets 47 (developed as angularly spaced adjustment screws 48a–c) are inserted into the base plate 42 of the probe-pin carrier in relative proximity to the outer circumference of the plate and in registry over the spring rings 53a–c of the coupling part. In the position of rest of probe pin 45, these permanent magnets provide a basic force ($F_o$) which corresponds to the specific contacting force of the probe head. This force becomes, as is known, smaller in the course of a deflection movement when the probe-pin carrier (with its magnets 47) lifts off from collar 51. By suitable dimensioning, the result can now be obtained that the force:path characteristics of the magnets 47 and of the three spring rings 53a–c have the course shown in the diagram of FIG. 6 and are so superposed on each other either that contacting force remains substantially constant during a deflection movement, or that contacting force decreases slightly from the specified value ($F_o$). Having eliminated the compression spring and its holding parts, the probe head of FIG. 5 can be axially shorter than that of FIG. 1; furthermore, assurance is had that the contacting force does not exceed specified values during the course of a deflection process, thus avoiding the danger of damage to a probe pin or to a workpiece.

The adjustable permanent magnets 47 can furthermore be completely dispensed with if the spring rings 53 and/or the plate 42 or the collar 51 consist of magnetizable material and have also been magnetized accordingly prior to probe-head assembly.

Mention has been made above that the piezoelectric element (3, 33, 43) will provide a pulse to identify the instant of probe contact with a workpiece. This is a function previously described in U.S. Pat. No. 4,177,568 (assigned to Carl-Zeiss-Stiftung) so that the instantaneously available contact-point coordinates of the coordinate-measuring machine may be latched into temporary storage, pending verification that the piezoelectric element has not produced a false signal, as might have been occasioned by a local transient vibration having nothing to do with probe contact with a workpiece. In the commercial Carl Zeiss "touch-trigger" probe, the verification procedure utilizes a circuit involving series-connection of all three of the support points of the involved statically determined at-rest position. If the piezo-pulse signal is attributable to a local transient vibration, the circuit through the three-point support will not be broken, and the temporarily stored latched CMM data will be automatically cancelled from potential use; if, on the other hand, the latched CMM data in temporary storage identifies the coordinates of a probe contact with a workpiece, the probe will have been deflected, with resultant opening of the series circuit via the three-point support. This circuit-opening event is used to generate a signal which effectively certifies the validity of a workpiece-contact pulse, and such a "validating" signal is used to transfer the CMM-coordinate data of workpiece contact, from latched storage and into the storage capacity of the computer associated with the CMM.

In the present invention, the nature of coupling 13 precludes use of the circuit-interruption "validating" signal of the Zeiss touch-trigger probe. On the other hand, the circuit of FIG. 7 provides an illustrative one of a variety of alternative techniques to obtain a validating signal in a probe-head construction of present nature.

Figure 7:
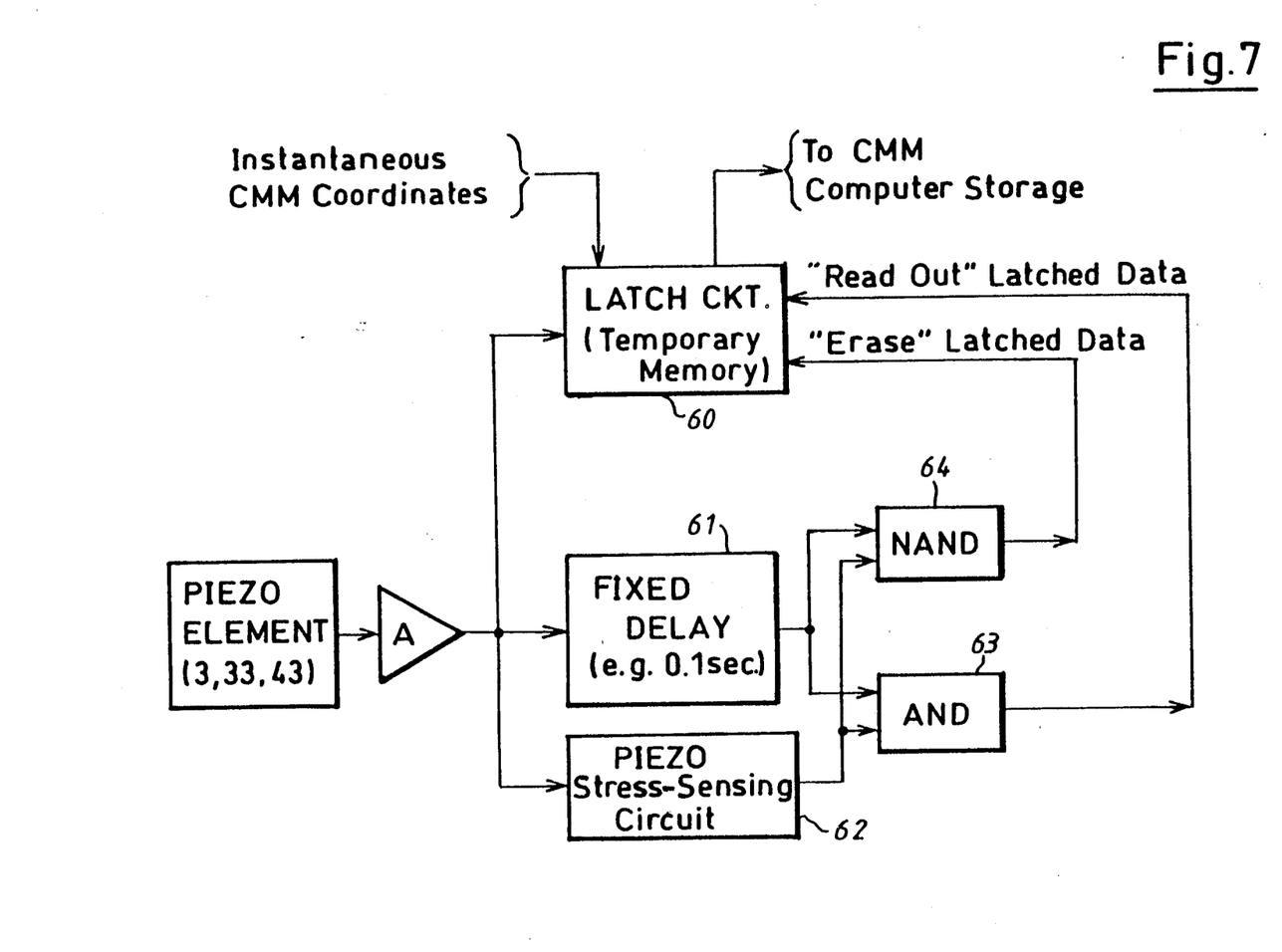
FIG. 7 is an electrical block diagram schematically showing a means of validating an electrical pulse that is generated upon probe contact with a workpiece.

In FIG. 7, the piezoelectric element of a movable probe-carrier will produce an output pulse which may or may not be indicative of probe contact with a workpiece. A latch circuit 60 is activated by the piezo pulse to immediately latch into temporary memory coordinate data for the instantaneous work-contact point of the probe. To determine the validity or invalidity of the latched data, a first circuit 61 places a delay of, say 0.1 sec., on the piezo pulse, and a second circuit 62 with means sensitive to piezo-element stress will develop a square wave, initiated concurrently with the piezo pulse and for as long as the piezo element remains stressed by probe deflection from the at-rest position. The output of circuit 62 is shown supplied to one of the inputs of an "AND" circuit element 63 and to one of the inputs of a "NAND" circuit element 64, while the other inputs of elements 63 and 64 are connected to receive the delayed output pulse from means 61.

If the timed delay at 61 is selected to be less than the duration of the square wave generated at 62, then the "AND" circuit responds, signifying validity of the latched data, and operating upon latching means 60 to control read-out of latched coordinates from means 60 and into CMM computer storage. On the other hand, a "NAND" circuit response signifies invalidity of the latched data and is operative upon the latch means 60 to "cancel" or "erase" the latched data.

It is noted that said U.S. Pat. No. 4,177,568 also discloses an optical technique for developing the validating signal which will determine whether or not latched CMM-coordinate data are to be released for entry into computer storage. Such an optical technique is also applicable to the present flexible-disk coupling in that a light source and photocell can be fixedly mounted to and within housing 1, as in the space between base plate 2 and the fixed plate 10, with a mirror on the upper surface of base plate 2, to reflect a sharply focused light beam to the photocell only when the probe-pin carrier is in its at-rest position. Any probe-pin displacement will deflect the light beam away from the photocell and thus enable creation of the validating signal for causing latched CMM-coordinate data to be entered into storage at the CMM computer. On the other hand, if the photocell senses continued incidence of the light beam, there has been no probe-pin deflection, and the erroneously latched CMM-coordinate data can be automatically erased.

What is claimed is:

1. A probe head of the switching type, comprising a fixed part (1) and a deflectable part (2) which mounts a probe pin (5) having a longitudinal axis that is centered in a position of rest by a leaf-spring coupling (13), said deflectable part (2) being urged axially and indirectly toward the fixed part (1) of the probe head by reason of the leaf-spring coupling (13) being interposed between the fixed and deflectable parts, the coupling (13) comprising a stacked plurality of individual leaf-spring disks (13a–c) lying on top of one another and interconnected at local sector regions which, with respect to said axis, are angularly offset from each other for the connection of successive adjacent pairs of disk surfaces, the connections being such that, in the position of rest, the disks are in flat-to-flat surface abutment with each other in the stack as well as in flat-to-flat surface abutment with said fixed part and with said movable part.

2. A probe head according to claim 1, in which the deflectable part (2) is urged against the fixed part (1) by means of an additional spring (7).

3. A probe head according to claim 1, in which the deflectable part (42) is urged against the fixed part (41) by magnetic forces (47).

4. A probe head according to claim 1, in which said disks are spring rings and the deflectable part (42) is urged against the fixed part (41) by the inherent elasticity of the spring rings (53a–c).

5. A probe head according to claim 1, in which the deflectable part (42) is urged against the fixed part (51) by spring force and additionally by means of magnetic force, such that the force to restore to the position of rest can remain substantially the same as a function of increasing deflection, or the restoring force can decrease as a function of increasing deflection.

6. A probe head according to claim 5, in which said disks are leaf-spring rings (53a–c) which consist of magnetizable material.

7. A probe head according to claim 5, in which the fixed part (51) consists of magnetizable material.

8. A probe head according to claim 5, in which the deflectable part (52) consists of magnetizable material.

9. A probe head according to claim 1, in which the leaf-spring coupling consists of three spring rings (13a–c, 23a–c, 53a–c) which lie one on top of the other.

10. A probe head according to claim 9, in which the angular offsets between connected locations (14a–c) of the leaf-spring rings (13a–c) are 120° apart about said longitudinal axis.

11. A probe head according to claim 1, in which the deflectable part (22) is further urged indirectly with respect to an intermediate ring (31), a second leaf-spring coupling (34) connecting the fixed part to said intermediate ring, said second leaf-spring coupling (34) comprising a stacked plurality of individual leaf-spring rings (34a–b) lying on top of one another and interconnected at local sector regions which, with respect to said axis, are angularly offset from each other, the connections of second individual rings to each other and to said fixed part and to said intermediate ring being such that, in the position of rest, the leaf-spring rings are in flat-to-flat surface abutment with each other as well as in flat-to-flat surface abutment with the fixed part and with said intermediate ring.

12. A probe head according to claim 11, in which the urging of the leaf-spring couplings (33, 34) is effected by magnetic forces.

13. A probe head according to claim 11, in which the urging of the leaf-spring couplings (33, 34) is effected by loading-spring forces.

14. A probe head according to claim 1, in which the deflectable part (2) is adapted to mount the probe pin (5) via a piezoelectric element for producing an electrical pulse signal responsive to probe contact with a workpiece.

15. A probe head according to claim 14, further including electronic means connected to said piezoelectric element and responsive to deflection stress on said piezoelectric element for producing a work-contact validation signal in the event of a deflection-stress response at a predetermined time after occurrence of said pulse signal.

16. A probe head according to claim 15, wherein said electronic means is responsive to said pulse-signal and to an absence of detected deflection stress on said piezoelectric element for producing a work-contact invalidating signal in the event of no detected deflection-stress response at said predetermined time after occurrence of said pulse signal.

17. A probe head according to claim 14, further including means for detecting whether said deflectable part (2) has or has not been deflected from its position of rest following the piezoelectric-element production of the electrical pulse signal, and electronic means connected for response to said detecting means and to the pulse from said piezoelectric element for producing a pulse-validating signal in the event of detected deflection and for producing a pulse-invalidating signal in the absence of detected deflection.

18. In a coordinate-measuring machine wherein instantaneous probe-position coordinate data are continuously accessible for selective storage in a computer, a probe head adapted for mounting to the machine and comprising a housing and a probe-pin carrier which, upon probe-pin contact with a workpiece, is deflectable from an at-rest position with respect to the housing, said probe-pin carrier including a piezoelectric element for producing an electrical pulse upon probe-pin contact with the workpiece, and said probe-pin carrier being flexibly coupled to said housing by a stack of like interconnected flat spring rings which, in the at-rest position of the probe-pin carrier, are in axially compressed direct abutment with each other and between a flat part of the housing and a flat part of the probe-pin carrier; means including a latch circuit responsive to the electrical pulse from said piezoelectric element to latch into temporary storage instantaneous probe-position coordinate data from the coordinate-measuring machine, means for detecting whether said probe-pin carrier has or has not been deflected from its at-rest position following the piezoelectric production of the electrical pulse signal, and electronic evaluating means connected for concurrent response to said detecting means and to the pulse from said piezoelectric element, said electronic means producing a pulse-validating signal supplied to said latch circuit for transferring latched coordinate data into computer storage in the event of detected probe-pin deflection and for producing a pulse-invalidating signal to said latch circuit for erasing coordinate data from latched storage in the absence of detected probe-pin deflection.

* * * * *